United States Patent
Stewart

(10) Patent No.: US 10,331,896 B2
(45) Date of Patent: Jun. 25, 2019

(54) METHOD OF PROTECTING SECRET DATA WHEN USED IN A CRYPTOGRAPHIC ALGORITHM

(71) Applicant: METAFORIC LIMITED, Glasgow (GB)

(72) Inventor: Neil William Stewart, Glasgow (GB)

(73) Assignee: INSIDE SECURE, Meyreuil (FR)

( * ) Notice: Subject to any disclaimer, the term of this patent is extended or adjusted under 35 U.S.C. 154(b) by 376 days.

(21) Appl. No.: 15/212,819

(22) Filed: Jul. 18, 2016

(65) Prior Publication Data

US 2017/0098089 A1 Apr. 6, 2017

Related U.S. Application Data

(63) Continuation of application No. PCT/IB2015/000057, filed on Jan. 21, 2015.

(30) Foreign Application Priority Data

Jan. 21, 2014 (GB) .................................. 1400992.2

(51) Int. Cl.
*H04L 9/00* (2006.01)
*G06F 21/60* (2013.01)

(52) U.S. Cl.
CPC ............ *G06F 21/602* (2013.01); *H04L 9/002* (2013.01); *H04L 2209/04* (2013.01); *H04L 2209/16* (2013.01)

(58) Field of Classification Search
CPC ....................................................... H04L 63/08
See application file for complete search history.

(56) References Cited

U.S. PATENT DOCUMENTS

2012/0278906 A1* 11/2012 Pedersen .................. G06F 21/76
726/34

FOREIGN PATENT DOCUMENTS

WO 2008101341 A1 8/2008

OTHER PUBLICATIONS

International Search Report and Written Opinion, issued in corresponding application PCT/IB2015/000057, dated Jul. 14, 2015, 10 pages, 10 pages.

(Continued)

*Primary Examiner* — Josnel Jeudy
(74) *Attorney, Agent, or Firm* — Brake Hughes Bellermann LLP

(57) ABSTRACT

In a general aspect, a method of generating a protected implementation of an algorithm includes: expanding an original source code implementing the algorithm into a single set of real operations; combining each real operation using real data with the real data it uses, to obtain a combination represented in a way which uses an actual real data fragment in a form different from an original form; producing a set of duplicated and mutated decoy operations representing an alternative implementation of the algorithm, applied to decoy data; combining the set of decoy operations with the set of real operations including the combinations, to obtain an implementation where the decoy operations interact with the real operations and the real data processed by the real operations, such that a real data flow of in the implementation is difficult to analyze; and transforming the implementation into a resulting code that can be executed.

39 Claims, 3 Drawing Sheets

(56) References Cited

OTHER PUBLICATIONS

Collberg, "Code Obfuscation", University of Arizona (http://www.cs.arizona.edu/collberg/Teaching/553/2011/Resources/obfuscation.pdf), May 3, 2011 [Retreived on Jul. 6, 2015], XP055200367, 108 pages.
Collberg, et al., "A Taxonomy of Obfuscating Transformations", Technical Report Department of Computer Science University Ofauckland, No. 148, Jul. 1, 1997, XP002140038, pp. 1-36.

* cited by examiner

US 10,331,896 B2

METHOD OF PROTECTING SECRET DATA WHEN USED IN A CRYPTOGRAPHIC ALGORITHM

CROSS REFERENCE TO RELATED APPLICATIONS

This application is a continuation of PCT Application No. PCT/IB2015/000057, filed Jan. 21, 2015, and also claims priority to Great Britain Application No. 1400992.2 filed Jan. 21, 2014, the disclosures of which are incorporated herein by reference.

BACKGROUND

The role of cryptography in computer software has become increasingly critical in recent years. In the past, the use of cryptography was limited to specific types of application but more recent concerns with privacy as well as security have forced application developers to respond with a significantly increased use of cryptography across a wide range of applications.

Unfortunately, this increase in the use of cryptography (as well as increases in other areas of security) has not yielded a significant increase in privacy or security in practice. One of the reasons for this is that standard cryptography algorithms are based on a premise that does not always exist in the real world.

A fundamental premise underlying all standard cryptography is that the secrets (such as keys) used to perform cryptographic operations are kept secret. If the secrets are exposed, then any information protected using those secrets is also exposed. In cryptographic literature, the entities involved in information exchange are modelled as opaque endpoints, such that if an entity makes use of a secret, then it is assumed that this secret remains private to that entity unless it transmits information that allows another entity to derive the secret.

In the real world, however, these entities are typically applications running on devices that may be subject to malware attacks or even direct access by malicious individuals. If an attacker has direct access to the software running on a device, then it is usually trivial for them to steal any secrets being used by cryptographic operations within those applications. When this occurs, the premise described above no longer holds and the affected application will no longer be gaining any benefit from the use of cryptography.

This problem has given rise in recent years to a new field called White Box Cryptography, which aims to solve the problem by re-implementing cryptographic operations in a form that prevents these secrets from being extracted directly from the application. At a minimum, a whitebox version of a cryptographic operation should prevent the secret data from being exposed in memory, even for a very short period of time. In practice, however, it also needs to resist attacks that aim to derive the secret data by examining the internals of the implementation.

Early attempts at producing whitebox implementations were highly algorithm-specific—the methodology used for each algorithm had to be carefully designed by an expert with intimate knowledge of the algorithm. They were very effective at preventing the secret data from being exposed in memory but far less effective at preventing its derivation through examination of the implementation's internals. The primary reason for this is that most cryptographic algorithms rely on the complexity of the operation as a whole—when viewed at a more granular level, this complexity is no longer present and secrets can often be derived by observing the flow of data through a relatively small part of the overall algorithm.

For example, the Advanced Encryption Standard (AES) algorithm performs the same sequence of steps multiple times (each time is called a round) and its strength relies on using 10, 12 or 14 rounds (depending on key size). If an attacker can observe the inputs and outputs for the individual rounds, they will be able to recover the key far more easily than if they were observing all of the rounds as a single, opaque unit.

More recent solutions have attempted to solve this problem by implementing the whitebox version of the algorithm using a heavily-obfuscated form in which the program and data flow are extremely difficult to follow and understand, either by a human or an automated process. Some of these solutions have proven to be very effective in practice, at least in terms of preventing key theft.

However, one problem that they have not significantly reduced is the effort required to support new algorithms. This remains a relatively manual process that requires significant expertise. This may not appear to be a serious issue given the limited number of algorithms in common use, and indeed, it is not an issue for use cases that require only static keys, but it does pose a problem for those that require dynamic keys.

A static key is a key that is known when the whitebox implementation is generated, and is a fundamental element of whitebox solutions—the process of creating a whitebox essentially involves embedding a static key into a version of the cryptographic algorithm in a form that makes it difficult to derive the key's value. A dynamic key is a key which is only known at runtime, which implies that it is passed to the whitebox instead of already being embedded within it, which goes against the inherently static nature of the whitebox.

To accommodate dynamic keys, a simple solution is to encrypt keys using another key (and possibly a different algorithm), where this other key becomes the static key embedded in the whitebox. The whitebox is then used to decrypt the real key, which is then used with a standard algorithm to perform the originally-intended operation.

The problem with this simple solution is that the real key will be exposed in memory when it is decrypted, which partially defeats the purpose of using a whitebox in the first place. Existing solutions have attempted to reduce this problem by combining the sequence of operations and obfuscating the result with a general-purpose obfuscation mechanism in order to make it more difficult to isolate the point at which the real key is exposed. This represents a significant compromise on the effectiveness of such solutions when applied to dynamic keys.

Another major issue with existing solutions is that they do not address a specific class of attacks on whitebox implementations which are commonly known as lifting attacks although a more accurate name would be out-of-context attack. An out-of-context attack is an attack in which the whitebox implementation is used by an attacker to perform the cryptographic operation on their behalf, without having to ever know the value of the key. Without specific defences against this type of attack, in practice, a whitebox implementation may provide no more security than a standard implementation.

In order to provide sufficient protection of cryptographic operations in the real world, it is therefore necessary to have whitebox implementations that support dynamic keys without significantly weakening the protection, and that prevent lifting attacks.

SUMMARY

The present disclosure describes a method of automatically generating whitebox implementations of arbitrary cryptographic algorithms directly from the source code of standard (non-whitebox) implementations.

The whitebox implementations generated by this method are designed to prevent secret data (such as keys) from being exposed or otherwise derived by an attacker with full access to, and control over, the program containing the implementation.

The present disclosure also describes a method of generating whitebox implementations where the secret data is dynamic, i.e. known only at runtime. This is achieved as a logical extension of the first method's ability to convert arbitrary algorithms, whereby two cryptographic algorithms are combined into a single whitebox implementation in a form that supports the use of dynamic secrets without exposing them outside of the whitebox.

Finally, the present disclosure describes a method of preventing whitebox implementations from being used out-of-context, i.e. being called directly by an attacker for malicious purposes rather than by the application for their intended purpose.

Although the primary purpose of the methods of the present disclosure is the generation of whitebox implementations of cryptographic algorithms, the methods themselves are not restricted to operating on cryptographic algorithms, although their effectiveness on other algorithms will depend on how many properties these algorithms share with cryptographic algorithms. In particular, algorithms that are highly deterministic with respect to runtime input data will generally produce the most effective results.

Embodiments relate to a computer-implemented method of generating a protected implementation of an algorithm expressed in the form of code stored in a memory, the method including: expanding an original source code implementing the algorithm into a single set of real operations; combining each real operation using real data with the real data it uses, to obtain a combination represented in a way which uses an actual real data fragment in a form different from an original form; producing a set of duplicated and mutated decoy operations representing an alternative implementation of the algorithm, applied to decoy data; combining the set of decoy operations with the set of real operations including the combinations, to obtain an implementation where the decoy operations interact with the real operations and the real data processed by the real operations, such that a real data flow of in the implementation is difficult to analyze; and transforming the implementation into a resulting code stored in the memory and that can be executed, wherein combining the set of decoy operations with the set of real operations, includes: interleaving operations from each set with operations from all of the other sets of operations, to obtain a combined set such that when the combined set is executed, all sets of operations are effectively executed at the same time; and conflating the data flow of operations from different sets within the combined set with each other by progressively selecting groups of operations and routing their outputs through a newly-generated routing operation which forwards each output to a correct receiving operation.

According to an embodiment, the algorithm is a cryptographic algorithm and the real data comprise secret data.

According to an embodiment, expanding the algorithm includes: executing by a simulator the original source code and recording operations being executed, control flow changes that occur and changes to memory that occur; determining code that is not executed during execution by executing the original source code multiple times by the simulator with different runtime inputs and combining results of these executions into the set of real operations; and injecting missing code that is not executed during the executions by the simulator, into the set of real operations.

According to an embodiment, expanding the algorithm includes producing a data dependency graph modeling data dependencies between operations of the set of real operations and data values flowing between the real operations.

According to an embodiment, expanding the algorithm includes eliminating operations of the set of real operations that produce statically-known values, including operations on the real data, such that each of a part of the real data is only present in a most derived form and is propagated as deeply as possible into a resulting set of real operations.

According to an embodiment, expanding the algorithm includes reducing the size of the set of real operations by eliminating a proportion of inlined function code and unrolled loops of the set of real operations generated through execution by the simulator, by replacing them with function calls and loops from the original source code, using a decision model that assigns a score to functions and basic blocks that represents a benefit level gained by eliminating inlining and/or unrolling versus a cost in loss of real data propagation that would occur by such an elimination.

According to an embodiment, expanding the algorithm includes: splitting original operations of the source code involving derived real data into multiple new operations such that each new operation uses a piece of the derived real data; transforming the pieces of the derived real data into unique subsets of operations that produce the pieces of the derived real data, where these subsets of operations consume sequence-sensitive data values generated at runtime; and inserting the subsets of operations into the set of real operations.

According to an embodiment, producing a set of duplicated and mutated decoy operations, includes repeating the expansion step a number of times to produce sets of decoy operations, where each set of decoy operations is supplied with randomly-generated data instead of the real data, to produce sets of decoy operations representing alternative, fake implementations of the algorithm.

According to an embodiment, the routing operation is constructed using a uniquely-generated opaque expression that consumes sequence-sensitive data values generated at runtime.

According to an embodiment, the operations of the implementation are expressed in terms of a small, uniform instruction set, transforming the implementation including: transforming operations sequences of the implementation into semantically-equivalent alternative forms using well-known obfuscating transforms; combining the operations of the transformed operations sequences to define a new much larger, non-uniform instruction set including new instructions each being defined as an individual function corresponding to the sequence of operations combined to produce the new instruction; and transforming the implementation using the new instruction set, to obtain a transformed implementation including operations each corresponding to an instruction of the new instruction set.

According to an embodiment, transforming the implementation includes generating execution control code which causes the operations to be executed in a correct sequence and with correct data to execute the algorithm, where execution is controlled by a set of decoder functions, each of the decoder functions being associated with one operation for which it knows the location of data required to execute the operation, and a location of a corresponding instruction function, and how to decode this data which is uniquely encoded for each decoder function.

According to an embodiment, the decoder functions consume sequence-sensitive data values generated at runtime.

According to an embodiment, transforming the implementation includes enabling obfuscation as a function of a complexity level, all obfuscations available at transformation step being enabled when the complexity level is set to a maximum value.

According to an embodiment, the method includes generating a new whitebox implementation for the algorithm where a secret data is known only at runtime, the generating including combining the implementation with a decryption algorithm using a static key, into the new whitebox implementation using a dynamic secret data which is pre-encrypted using the static key, the decryption algorithm decrypting the dynamic secret data which is transmitted to the implementation.

According to an embodiment, the method includes generating a new whitebox implementation performing data-processing operations on an encrypted data without revealing the content of the encrypted data, the generating including combining a decryption algorithm, the implementation and an encryption algorithm into the new whitebox implementation, where the decryption and encryption algorithms are the inverse of each other and use a same static key, whereby the decryption algorithm decrypts the data to be processed, the implementation operates on the decrypted data and the encryption algorithm re-encrypts the data.

According to an embodiment, the method includes preventing the implementation from being used in contexts other than those intended by a program containing the implementation, the preventing including: injecting conflation producers into the program where the conflation producers generate conflation data as the implementation executes, by mixing either randomly-generated data or real data with existing conflation data; and injecting conflation targets into the implementation, where the conflation targets read conflation data and combine these data with static data used by operations inside the implementation, and where the static data used by the operations are modified such that they are incorrect and the correct data are produced only when they are combined with the conflation data, making the operations dependent on the conflation data being correctly generated by the execution of the program, where each piece of conflation data has a distinct location known only to the conflation producers that need to modify it and to the conflation targets within the implementation.

According to an embodiment, the method includes obfuscating each intermediate data element, and associating each intermediate data element with an obfuscation context that is unique to that data element and specifies how the data element is obfuscated.

According to an embodiment, the method includes injecting additional, randomized memory access operations throughout the implementation to mask memory access patterns exhibited by the real operations.

According to an embodiment, the method includes randomizing the locations of data fragments of the real data accessed in memory by the real operations.

Embodiments may also relate to a non-transitory computer-readable medium storing an application adapted to be run on a device, and generated by applying the above-defined method.

Embodiments may also relate to a device for protecting an algorithm expressed in the form of code, the device being configured to implement the above-defined method, to generate a protected implementation of the algorithm.

DETAILED DESCRIPTION

The present disclosure relates to, and describes a number of illustrative embodiments. Those skilled in the art will appreciate that the approaches and techniques described herein may be implemented in a number of different applications and embodiments and is not specifically limited in its application to the particular embodiments depicted herein.

An illustrative embodiment relates to a method of generating a whitebox implementation to automatically generate whitebox implementations of arbitrary cryptographic algorithms directly from source code of standard (non-whitebox) implementations.

Another illustrative embodiment concerns a method of generating whitebox implementations where the secret data is dynamic, i.e. known only at runtime.

Another illustrative embodiment concerns a method of preventing whitebox implementations from being used out-of-context, i.e. being called directly by an attacker for malicious purposes rather than by the application for their intended purpose. Each of these will be described in turn below.

Figure 1:
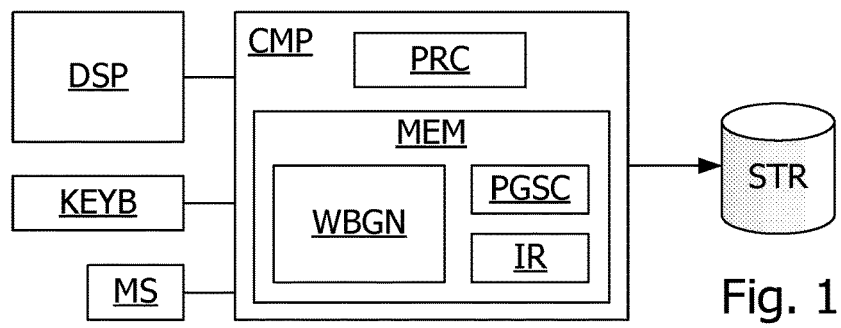
FIG. 1 illustrates an environment suitable for practicing an illustrative embodiment.

FIG. 1 depicts an environment suitable for practicing an illustrative embodiment. An electronic device CMP includes memory MEM, on which software according to one embodiment can be stored, a processor (CPU) PRC for executing software stored in the memory MEM, and other programs for controlling system hardware. Typically, the interaction of a human user with the electronic device CMP occurs through an input/output (I/O) device, such as a user interface. The I/O device may include a display device DSP (such as a monitor) and one or more input devices such as a mouse MS and a keyboard KEYB and/or other suitable conventional I/O peripherals such as a touch screen, and network interfaces.

The memory MEM holds an application WBGN capable of automatically generating whitebox implementation of algorithms directly from standard source code PGSC of implementations of the algorithms.

The electronic device may be a computer or any other computing device such as a smartphone, a digital tablet or a connected object.

In an alternative embodiment, the electronic device CMP is also interfaced with a network, such as the Internet. Those skilled in the art will recognize that the program source code PGSC may be stored either locally on the electronic device CMP or at a remote location interfaced with the electronic device over a network. Similarly, the whitebox generating application WBGN may be stored on a networked server or a remote peer.

1. Generating a Whitebox Implementation

Figure 2:
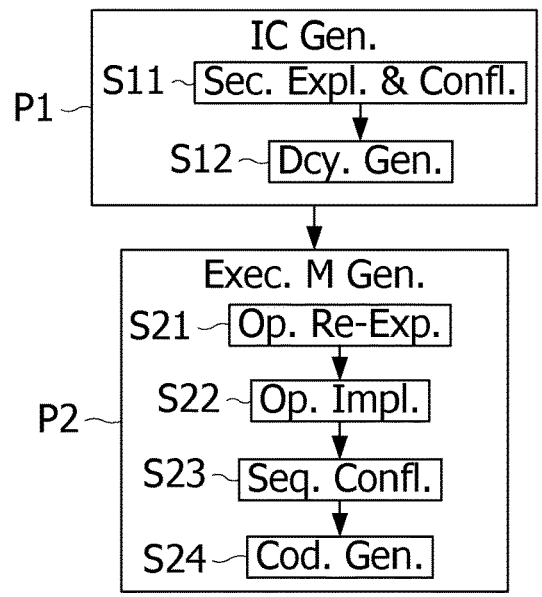
FIG. 2 is a flow chart of a method of generating a whitebox implementation, according to an embodiment.

The method of generating a whitebox implementation according to an embodiment includes two main processes P1, P2, each of which is divided into multiple phases, as shown in FIG. 2. The processes P1, P2 are implementation core generation P1 and execution machine generation P2. The process of Implementation Core Generation P1 generates a set of low-level operations that implement an initial whitebox version of an input algorithm which may be a cryptographic algorithm. This set of operations is considerably more complex than the input algorithm and may employ a number of techniques to resist key extraction attacks.

The process of execution machine generation P2 transforms the set of operations produced above which are not in a readily-executable form yet, into an executable form that may provide additional protection against key extraction attacks. The output of this process is a stand-alone source code that can be compiled into an existing project and executed directly. This is typically C source code but other implementation languages can be used such as Java.

The processes P1, P2 of the method receive the input algorithm as an Intermediate Representation (IR) which is produced by parsing the algorithm source code. Cryptographic algorithms are most commonly implemented in C, but the method is applicable both to compiled and interpreted programming languages. The code produced by the method may be adapted to be executed by any computing device such as computers, smartphones or digital tablets, or any connected object. The method is all the more useful when the device intended to execute the algorithm to be protected is designed around an open platform and/or connected to a public network.

The processes P1, P2 are described in more detail below. The process of implementation core generation P1 is responsible for generating a set of low-level operations that implement the initial whitebox version of the input algorithm. According to an embodiment, the process P1 includes two phases S11, S12 of secret explosion and conflation, and decoy generation: The first phase S11 of secret explosion and conflation expands the algorithm into a large set of low-level operations and combines each operation with any secret data it uses. The combinations of operations and secret data are represented in a way which does not use the actual secret data fragments in their original form.

The second phase S12 of decoy generation produces a large set of duplicated and mutated decoy operations that will exist alongside and execute along with the real operations provided by process P1. These decoys interact with the real operations and the data to be processed in a way that makes establishing a reliable flow of data through the implementation extremely difficult.

Figure 3:
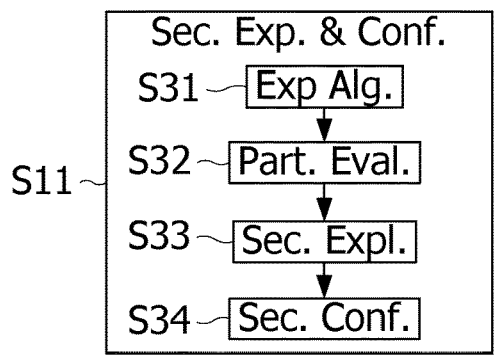
FIGS. 3 and 4 are flow charts of phases of the method of generating a whitebox implementation, according to embodiments.

According to an embodiment, the phase S11 includes as represented in FIG. 3 the four following steps:
algorithm expansion (step S31),
partial evaluation (step S32),
secret explosion (step S33), and
secret conflation (step S34).

In step 31 of algorithm expansion, the algorithm is expanded into the complete set of operations that are used to implement the algorithm given the available static input data (e.g. secret data). These operations represent the algorithm in its most inlined, unrolled form. This step also produces a data dependency graph that models all knowable data dependencies between the operations along with the values of the data flowing between them.

In step 32 of partial evaluation, the operations undergo a partial evaluation which eliminates operations that produce statically-known values. The primary purpose of this step is to eliminate intermediate operations on secret data such that it is only present in its most derived form and at the points where it begins to interact with non-static data (e.g. blocks of data to encrypt/decrypt).

In step 33 of secret explosion, any remaining operations involving derived secret data are split into multiple operations such that each new operation uses a smaller portion of the derived secret data than the original operation. This process is applied repeatedly until no operation uses more than a certain number of bits of derived secret data (this can be as low as a single bit).

In step 34 of secret conflation, all of the derived pieces of secret data are transformed into unique sets of operations that produce the data rather than store it. These unique sets of operations are sequence-sensitive (as described below), which means that the data they produce depends on almost all of the previous operations performed by the implementation up until that point. These data-producing operations are then combined with the operations that use the data, such that the production of the data and the use of the data are almost indistinguishable.

In step S31 of algorithm expansion, the algorithm is expanded into the complete set of operations that are used to implement the algorithm given the available static input data (e.g. static key data). These operations represent the algorithm in its most inlined, unrolled form. As a simple example, the expansion process is applied to the following pseudo-code:

```
1 a=0
2 i=0
3 loop:
4 a=a+10
5 i=i+1
6 if i<5 goto loop
```

This pseudo code includes a simple loop and input "a" and "I" for this loop. Expansion of this pseudo-code initially produces the following operations:

```
1 a=0
2 i=0
3 a=a+10
4 i=i+1
5 a=a+10
6 i=i+1
7 a=a+10
8 i=i+1
9 a=a+10
10 i=i+1
11 a=a+10
12 i=i+1
```

In this expanded pseudo-code, the loop has been unrolled and the conditional ('if') statements have been eliminated.

A more complex example including function calls and more program flow control would also show functions being inlined and unreached code being eliminated, but this simple example will aid clarity when working through the rest of the process. This expansion step also produces a data dependency graph that models all knowable data dependencies between the operations along with the values of the data flowing between them. A representation of this graph for the above simple example is as follows:

1 a=0
2 i=0
3 a=a{0:#1:c}+10
4 i=i{0:#2:c}+1
5 a=a{10:#3:c}+10
6 i=i{1:#4:c}+1
7 a=a{20:#5:c}+10
8 i=i{2:#6:c}+1
9 a=a{30:#7:c}+10
10 i=i{3:#8:c}+1
11 a=a{40:#9:c}+10
12 i=i{4:#10:c}+1

In the above representation, each value that has a dependency on another operation is decorated with dependency information in braces, with the following format:

{value:#source:state}

Where 'value' is the runtime content of that value (at that point in time), 'source' is the operation that produced that value and 'state' indicates whether the value is derived solely from constant inputs (indicated by 'c') or from at least one variable input (indicated by 'v'). For example, on line 7, the decorated memory location "a" has a runtime value of 20 which was produced by the operation on line 5, and that the value is derived solely from constant input data. It is worth noting that the examples shown here are merely a representation of the process and may not directly correspond to the physical representation used to implement the process. For example, in the current example embodiment, the operations exist at a lower-level than the pseudo-code shown here and do not have constructs such as 'for' loops. The current embodiment also limits itself to operations that have no more than one output, which simplifies the dependency model. The process is however applicable to a wide range of physical representations.

The algorithm expansion step S31 is achieved by generating a simulator that executes the algorithm and records what happens during execution, including:

each executed operation is recorded, along with the actual values of its parameters and their constant/variable state;

all control flow changes, including function calls, function exits, conditional branches and unconditional branches are recorded, but are marked as distinct from normal operations because their effects are already present in the normal operations that have been recorded; for example, if a function is called, then the recording will contain the following sequence: 1) a call operation; 2) the operations within the called function; 3) a function exit; and 4) the remaining operations in the caller function; and the state of all memory locations written by operations are recorded in a map which stores (for each) the last operation to write to that location and the constant/variable state of that location as a result of that operation. If the operation's input values are all constant, then the written memory location will be recorded as constant; otherwise it will be recorded as variable.

The manner by which the memory state map is updated for the example code is shown in the Table I below:

TABLE I

| | a | | | i | | |
|---|---|---|---|---|---|---|
| Op | Value | Last Op | State | Value | Last Op | State |
| 1 | 0 | 1 | c | — | — | — |
| 2 | 0 | 1 | c | 0 | 2 | c |
| 3 | 10 | 3 | c | 0 | 2 | c |
| 4 | 10 | 3 | c | 1 | 4 | c |
| 5 | 20 | 5 | c | 1 | 4 | c |
| 6 | 20 | 5 | c | 2 | 6 | c |
| 7 | 30 | 7 | c | 2 | 6 | c |
| 8 | 30 | 7 | c | 3 | 8 | c |
| 9 | 40 | 9 | c | 3 | 8 | c |
| 10 | 40 | 9 | c | 4 | 10 | c |
| 11 | 50 | 11 | c | 4 | 10 | c |
| 12 | 50 | 11 | c | 5 | 12 | c |

Each table row of Table I represents each operation being executed and the state of every memory location after that operation has been executed. Each memory location "a" and "i" is represented by 3 columns showing the value of that location, the last operation to write to that location and the constant/variable (c/v) state of the location. The locations "a" and "i" are alternately changed from operation 1 to 12. When looking again at operation 7 (at row 7), we can see that, before the operation executes (reading from row 6), the location for "a" has a value of 20 and was last written to by operation 5, which corresponds to the dependency information recorded in the above data dependency graph. After operation 7 executes (after row 7), as can be seen, the location "a" has changed and now has a value of 30 with its last operation now set to 7.

With this simple example code, it might appear that the use of memory state mapping is overkill; the state data could be simply associated with each variable (a and i) and achieve the same result. However, real programs have much more complicated memory access patterns, including arrays, structures, allocated memory and pointer aliasing; memory state mapping allows to support all memory access patterns with a single mechanism.

When the simulator executes the algorithm, some code may not actually be executed. In some cases this is desirable; the algorithm may contain unreachable code or conditional code that will never be executed and this will naturally be discarded by the simulation process. Depending on the algorithm, however, there may be cases where code is not executed during the simulation but could be under different conditions. When this occurs, it is established whether the code was not executed due to decisions based only on known static data. If this is the case, the code is simply classified as unused code; if not, then the code is classified as input-dependent code. Input-dependent code can be handled by injecting the missing original code into the expanded set of operations along with the decision logic that allows it to be executed instead of the operations that were actually executed during simulation, given a set of inputs that would cause the alternative decision to be made. This allows the resulting implementation to work when faced with unseen inputs but the re-injected code will not have complete dependency information, which limits ability to reason about it in subsequent steps.

In many cases, input-dependent code will either not exist or only represent a small proportion of the code and will therefore not constitute a significant problem. In cases where it is more prevalent, the above solution is far from ideal because it will limit ability to adequately perform the subsequent processing steps, which may in turn limit the protection provided by the whitebox process as a whole. To mitigate this, the simulation is allowed to be executed multiple times with different runtime inputs and combine the results of these simulations into a single expanded set of operations with some runtime decision logic. If the inputs are selected such that the simulator is able to see all possible execution paths, then a complete expanded set of operations can be constructed. If at least one execution of each input-dependent code path but not all instances of it is detected, then a dependency graph without runtime value information can still be constructed.

In the partial evaluation step S32, the operations undergo a partial evaluation which eliminates operations that produce statically-known values. The primary purpose of this step is to eliminate intermediate operations on secret data such that it is only present in its most derived form and at the points where it begins to interact with non-static data (e.g. blocks of data to encrypt/decrypt). Because this step is operating on an inlined and unrolled model of the algorithm, and because secret data are treated as static input data, this results in a large proportion of the operations being eliminated. To illustrate this, the result of this step when applied to the simple example program can be reduced to the following lines:

a=50
i=5.

This result occurs because all of the operations on the memory locations "a" and "i" produce statically-known values. Both are initialized with constant values and then successively modified by combining their current values with another constant value, which means that their outputs are always statically-known. In reality, even these two lines of code would not actually exist. If the program was extended with other code that used variables "a" and "i", then those operations would use the values 50 and 5 directly as constants and variables "a" and "i" would not exist. If the variables "a" and "i" were not used by later code, then they would simply not exist. The complete partial evaluation process is relatively complicated but the basic process can be shown using the simple example program. Starting with the expanded form with dependency information from the data dependency graph, we can start with operation 1 and eliminate it because it clearly produces statically-known data, as does operation 2. Operation 3 also produces statically-known data because it combines a value "a" that the dependency information indicates is constant with a literal value (10), so it can be eliminated as well. The same is true for the remaining operations, which means all of them can be eliminated. This leaves us with variable "a" having a value of 50 and variable "i" with a value of 5, but without needing any operations to produce those values; logically, the two assignments shown above are present, but they will never exist as actual assignments.

The process becomes more complicated when variable (non-statically-known) values and the fully inlined and unrolled nature of the operations are considered. In many cases, it is not practical to generate a whitebox implementation with the fully inlined and unrolled operations; the resulting implementation would be too large to be of practical use. To produce a practical implementation, some of the inlining and/or unrolling need to be eliminated. The problem with eliminating these things is that they contribute greatly to the volume of statically-known data within the operations. It can be seen why by looking at the simple example program. If the unrolled code were to be turned back into a loop, then both "a" and "i" would become variables (despite being derived solely from constant inputs) and would in turn "pollute" any subsequent code that used them, making their outputs variable. A similar effect occurs when inlining is eliminated. The problem with this is that the primary goal is to propagate the secret data as far into the implementation as possible in its most derived form, and this propagation terminates when the secret data meets any variable data.

One of the goals of the partial evaluation step S32 is therefore to eliminate as much inlining and unrolling as it can while minimizing the impact this has on the propagation of derived secret data through the implementation. To do this, a decision model is established, where a score to functions and basic blocks are assigned, that represents the level of benefit gained by eliminating inlining/unrolling versus the cost in loss of secret data propagation. The benefit component of the score is proportional to the amount of code reduction that the elimination would provide. The cost component is calculated by summing the propagation losses of all of the pieces of secret data affected by the elimination. An individual propagation loss is calculated by measuring the number of additional operations that the piece of secret data is involved in before it reaches what would have been its most derived form. A natural consequence of the cost component is that code near the top of the call graph will tend to have a much higher cost than code at the leaves of the call graph. Because of this, the decision process operates bottom-up and terminates when sufficient code reduction has been achieved. A simplified example of this is shown in FIG. 5.

Figure 5:
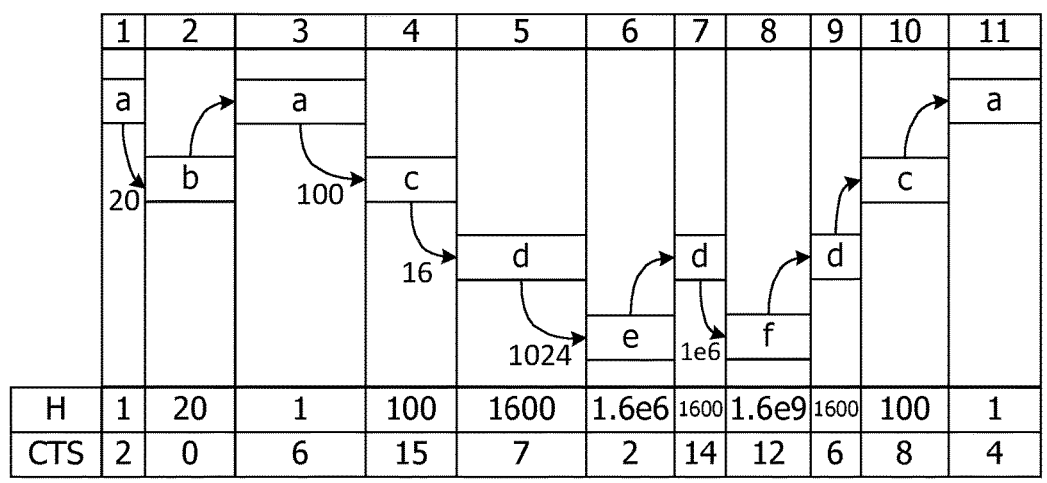
FIG. 5 is a simplified example of a call graph illustrating a partial evaluation step, according to an embodiment.

The column numbers at the top of FIG. 5 refer to parts of the graph, the call graph being shown underneath, with each box representing a piece of a function (function name shown inside the box); wider boxes represent function pieces with more operations in them. The start of execution is at the top-left; calls are shown by a downwards arrow and function exits are shown by an upwards arrow. All calls are executed within a loop in the parent function, with the call count indicated on the downwards arrow.

Below the call graph, two rows of information "H" and "CTS" are shown, where each column is associated with the call graph element directly above it. The "H" row shows the total number of times each element in the corresponding column is executed. Functions "e" and "f" at the bottom of the call graph are executed a large number of times due to several levels of looped calls. The "CTS" row shows how many operations in the corresponding columns produce constant, derived secret data.

Because this is a simplified example, the cost of eliminating inlining/unrolling will be modeled as being proportional to the number of operations that produce constant, derived secret data within the affected region. As described earlier, the real cost is calculated by measuring the propagation loss of secret data. By comparison, this example assumes that the propagation loss is always 1; this is a reasonable approximation for illustrative purposes.

Scoring calculations obtained from the example of FIG. 5 are presented in the following Table II:

TABLE II

| Fct. | Size | H | CTS | Benefit | Self Cost | Child Cost | Cost | Score |
|---|---|---|---|---|---|---|---|---|
| a | 60 | 1 | 12 | 60 | 12 | 1.92E+10 | 1.92E+10 | 0.000 |
| b | 20 | 20 | 0 | 400 | 0 | 0 | 0 | 400.000 |
| c | 40 | 100 | 23 | 4000 | 2300 | 1.92E+10 | 1.92E+10 | 0.000 |
| d | 50 | 1600 | 27 | 80000 | 43200 | 1.92E+10 | 1.92E+10 | 0.000 |
| e | 20 | 1638400 | 2 | 3.3E+07 | 3276800 | 0 | 3276800 | 10.000 |
| f | 20 | 1.6E+09 | 12 | 3.2E+10 | 1.92E+10 | 0 | 1.92E+10 | 1.667 |

The results in column "Benefit" are calculated as "Size*H", and the results in column "Self Cost" are calculated as "CTS*H". The results in column "Child Cost" are calculated by adding the "Self Cost" numbers of the function's children (the functions that it calls). The results in column "Cost" are simply calculated as "Self Cost+Child Cost". The reason for including the child cost is that, if inlining/unrolling on a region of code is eliminated, this will impact almost everything that depends on it. In the case of a function, this means the functions it calls. Finally, the results in column "Score" calculated as "Benefit/(Cost+1)". As can be seen from Table II, function "b" would be the first candidate as having the highest score. Although it has a fairly small benefit, it has zero cost, making it a good choice. The next candidate would be function "e" which has a fairly high cost but also has a very large benefit. After this function "f" could be used; both the benefit and cost of function "f" are very large but the benefit still wins out. Functions "a", "c" and "d" would be particularly bad candidates; being at the top of the call graph means that they have a very large cost, and none of them have much benefit.

It is worth noting that in practice, the scoring calculations actually change as each selection is made. In particular, the cost associated with a selection will only occur once, and so any other selections that also included that cost will have their cost reduced accordingly.

In step S33, any remaining operations involving derived secret data are split into multiple operations such that each new operation uses a smaller portion of the derived secret data than the original operation. Each type of operation can be split in many different ways. For example, consider a 32-bit multiply operation, "s*t", where "s" is a secret data and "t" is another piece of (presumably variable) data. This operation can be split into a sequence of shift & add operations where each shift operation represents a single bit from "s". Alternatively, the multiply operation could be split into a multiply & add sequence where each multiply only uses a small number of bits of "s". For a simpler example, consider the XOR operation below:

s=0x1234abcd
t=0x10203040
u=s XOR t

As with the previous example, "s" is the secret data and "t" is another piece of (presumably variable) data. For clarity, both variables "s" and "t" are shown being assigned their values; in practice, the value of "s" will be used directly in the XOR operation as a literal value and "t" will already exist with some variable value. This operation can be split into a sequence consisting of two XOR operations and an OR operation, as shown below:

s1=0x12340000
t1=0x10200000
s2=0x0000abcd
t2=0x00003040
u1=s1 XOR t1
u2=s2 XOR t2
u=u1 OR u2

In this case, splitting was achieved by performing a XOR on the top 16 bits of "s" and "t" and a XOR on the bottom 16 bits, and then combining the results with an OR operation. Splitting the components into even smaller pieces is a trivial extension of this scheme; for example, they can be split into four 8 bit pieces using 4 XORs and 3 ORs.

The examples shown here only involve splitting up the secret data with respect to a single operation. In practice, however, it is done with sequences of operations by combining an operation involving the secret data with subsequent operations that are dependent on the result of the first operation (and therefore on the secret data).

An example of this is shown below:

s=0x1234abcd
u=s XOR t
v=a+b
w=u*v

In this example, secret data "s" is XORed with "t" to produce "u", which is subsequently used on line 4 to produce "w". The presence of line 3, which is not dependent on "s" in any way, serves to indicate that the dependents of "s" may not be contiguous; indeed, they may be separated by many unrelated operations. To split the secret data with respect to more than one operation, this example can be rewritten as show below:

s=0x1234abcd
v=a+b
w=(s XOR t)*v where line 3 is an expression that replaces "u" in the original code with the operation that produces its value ("s XOR t").

Instead of creating a split operation for "s XOR t", a split operation is created for the expression "(s XOR t)*v", which represents a sequence of two dependent operations on "s". This can be extended to an arbitrary depth of dependents from the derived secret data. This explosion process is applied across the set of operations repeatedly until no operation uses more than a certain number of bits of derived secret data. The number of bits each piece of derived data is split into will also depend on how the derived data is related to the original secret data; if they are strongly correlated, then they will tend to be split into a smaller number of bits.

In step S34 of secret conflation, all of the derived pieces of secret data (many of which may be as small as a single bit) are transformed into unique sets of operations that produce the data rather than store it. These unique sets of operations are sequence-sensitive (as explained below), which means that the data they produce depends on almost all of the previous operations performed by the implementation up until that point. These data-producing operations are then combined with the operations that use the data, such that the production of the data and the use of it are almost indistinguishable.

Figure 4:
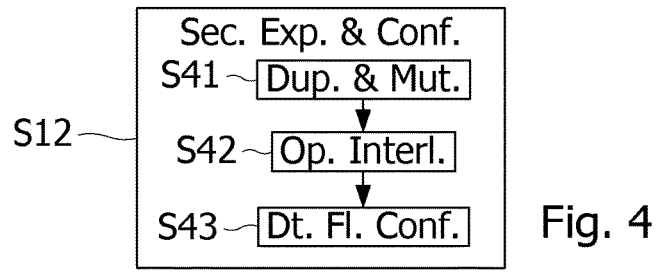

According to an embodiment, the phase S12 of decoy generation includes as shown in FIG. 4 the following steps:

a step S41 of duplication and mutation;
a step S42 of operation interleaving; and
a step S43 of data flow conflation.

In the step S41 of duplication and mutation, the secret explosion & conflation phase is repeated a number of times with random data replacing the secret data to produce sets of operations representing alternative, decoy implementations of the chosen algorithm.

In the step S42 of operation interleaving, all of the generated operations (real and decoy) are combined into a single, large set of operations where operations from each set are interleaved with operations from all of the other sets, such that when the combined set is executed, it is effectively executing all sets of operations.

The step S43 of data flow conflation is performed after interleaving. Before performing this step, the combined set of operations still consists of unrelated sets of operations—they are simply located amongst each other. In this final step, these unrelated operations are conflated with each other such that the data flow through the entire, combined set of operations is difficult to determine.

In the step S41 of duplication and mutation, the secret explosion and conflation phase is repeated a number of times with random secret data to produce sets of operations representing alternative, decoy implementations of the chosen algorithm. Because the generation process is dependent on the value of the secret data, each set of generated operations will be unique. We refer to this as mutation since the results are effectively mutated, but the actual process is to generate them with different starting seeds. By default, randomly generated data are simply used in place of the real secret data. This is fine when the secret data is indistinguishable from random data, but if any of the secret data does not have this property, decoy data is needed to use that better matches the nature of the secret data. This is solved by allowing algorithms to provide algorithm-specific filters that tailor the randomly generated data to make it suitable as decoy secret data.

Figure 6:
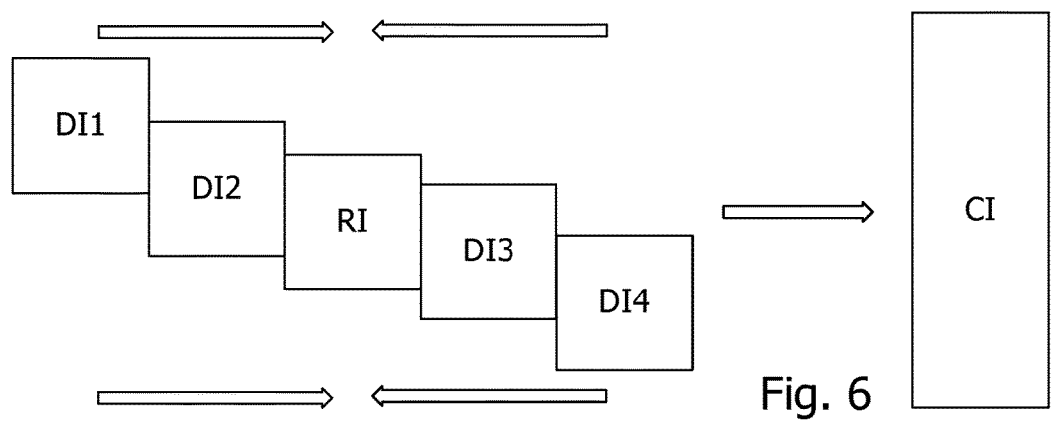
FIG. 6 is a simplified example illustrating an operation interleaving step, according to an embodiment.

In the step S42 of operation interleaving, all of the generated operations (real and decoy) are combined into a single, large set of operations, as illustrated in FIG. 6. FIG. 6 shows decoy operation sets DI1, DI2, DI3, DI4 and a real operation set RI which are interleaved to obtain a single large combined set of operations CI. In the operation set CI, operations from each operation set DI1 to DI4 and RI are interleaved with operations from all of the other sets (according to arrows above and below the sets), such that when the combined set CI is executed, it is effectively executing all operation sets DI1 to DI4 and RI. The interleaving is specifically designed to be partially overlapped such that there is no direct correspondence between the operations from different sets that happen to be near each other. Specifically, the real set of operations RI is always situated away from the very beginning and very end of the combined set CI.

Figure 7A:
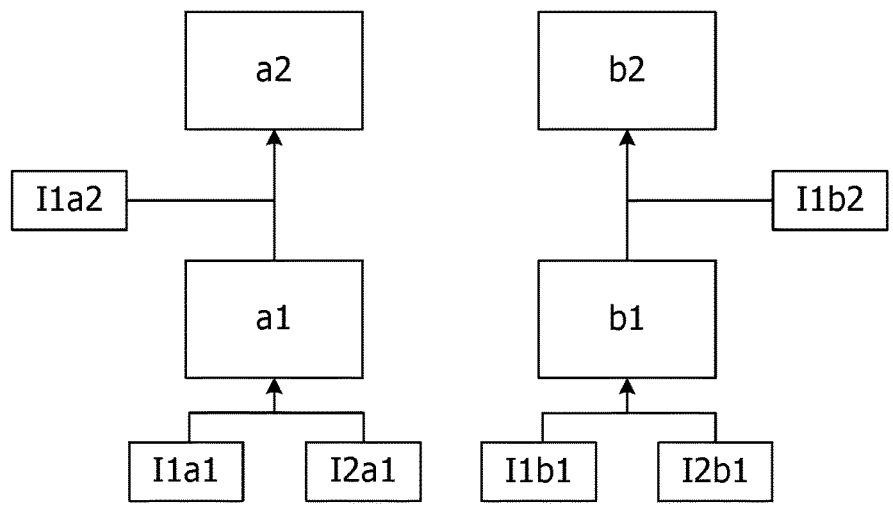
FIGS. 7A and 7B show a simplified example of separate sets of operations, prior to and after a step of data flow conflation, according to an embodiment.
Figure 7B:
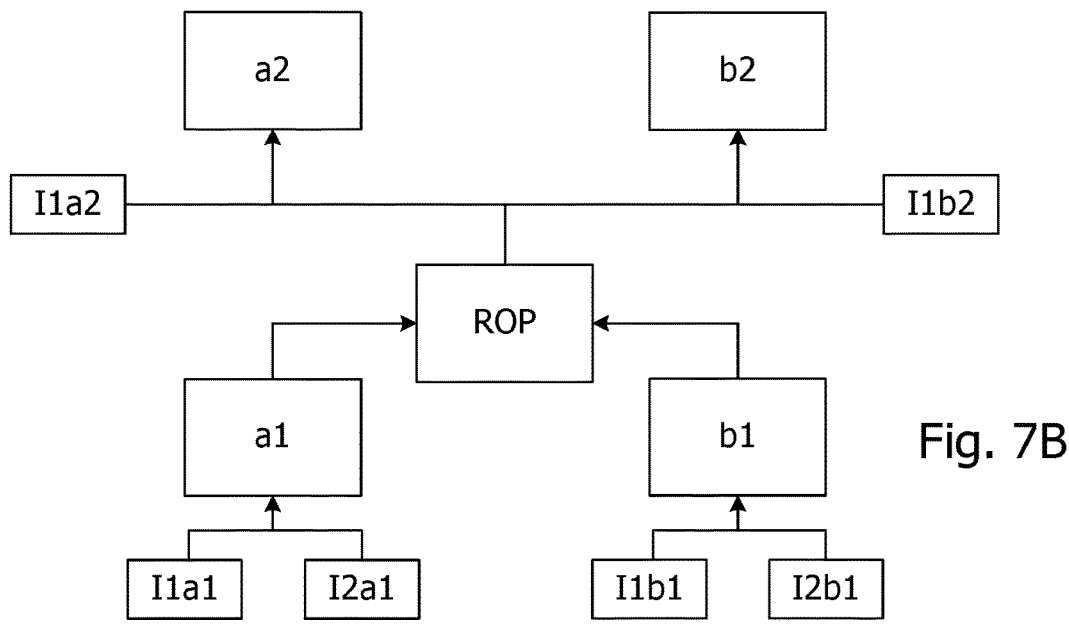

After interleaving has occurred at step S42, the combined set of operations still consists of unrelated sets of operations, which are simply located amongst each other. In the final step S43 of data flow conflation, these unrelated operations are conflated with each other such that the data flowing through the entire, combined set of operations are difficult to determine. This is achieved by progressively selecting groups of operations with outgoing data flow and pushing all of their output data through a newly-generated operation which routes their output data to the correct receiving operation. This routing operation is constructed using a uniquely-generated opaque expression which also uses sequence-sensitive conflation (as explained below). To see how this works, the example in FIG. 7A shows two separate sets of operations to combine using data flow conflation. FIG. 7A shows operations "a1", "a2" on the left, and operations "b1", "b2" on the right. Operation "a1" has two inputs "I1a1 and "I2a1". Operation "b1" has two inputs "I1b1 and "I2b1". Operation "a2" receives a variable "I1a2 and an output of operation "a1". Operation "b2" receives a variable "I1b2 and an output of operation "b1". In order to combine operations "a1", "a2", and operations "b1", "b2" using data flow conflation, these operations are positioned such that operations "a1" and "b1" both execute before either of operation "a2" or "b2" execute, because an additional operation is added between operations "a1" and "a2" and also between operations "b1" and "b2". The result of performing data flow conflation on these operations is shown in FIG. 7B. In FIG. 7B, a routing operation ROP is inserted such that it will execute after operations "a1" and "b1" have executed but before operations "a2" or "b2" execute. As can be seen, rather than operations "a1" and "b1" passing their outputs to operations "a2" and "b2" respectively, they pass them to the routing operation ROP, which then passes them onto the correct recipients, i.e. operations "a2" and "b2". An opaque expression used by the routing operation ROP makes it very difficult to determine which output will go to which recipient; in particular, this is almost impossible to determine via static analysis. The data flow conflation process proceeds until all of the data flow in the combined set of operations has been sufficiently conflated.

The set of operations produced by the implementation core generation process cannot be executed in that form, so they are transformed into an executable form to produce an implementation that can actually be used. The execution machine generation process P2 performs this transformation and produces source code which can be included into a software project and called directly to perform the desired cryptographic operation. However, according to an embodiment, rather than performing a simple, direct translation of the operations into code, the process P2 generates a specialized machine for executing the operations that provides significant additional protection against key extraction attacks.

At a conceptual level, the generated machine is roughly analogous to a Virtual Machine (VM) in the sense that there is an execution engine that processes a virtual program and performs the operations specified by that program in the context of a virtual machine model. At the implementation level, however, there are a number of significant differences:

each generated machine is unique: the operations that it can perform, how it performs them, the way in which they are expressed and the mechanisms that execute them are unique to each machine;

machines do not have an instruction set: the set of operations that a given machine can execute could be considered to be an instruction set, but they have no discernible conceptual meaning that would allow them to be given names and used in such a way;

machines do not execute programs: a given machine is only capable of executing one specific program and that program is an integral part of the machine itself, and in many cases, there is no boundary between the execution side of the machine and the program side;

there is no execution engine in a machine: each machine consists of a large number of execution elements that are responsible for performing operations and each of these is also responsible for determining the next operation to perform, and there is no "central engine" which is involved in all execution steps;

a machine has no virtual machine model: the implementation of any given operation is not associated with a specific virtual CPU or any other structure that would place any restrictions on how it is implemented, and the only exception to this is that there is a program stack that is used to implement function calls but there is no prescribed calling convention that is used for machine-internal calls; and machines cannot be statically analyzed: aside from the inherent difficulty in statically analyzing a unique machine with no instruction set, no discernible program and no machine model, the process of executing a machine is entirely dependent on sequence-sensitive conflation operations (as explained below), and no part of the machine can be understood (even by the machine itself) until execution has reached that part;

According to an embodiment, the process of generating a machine includes as shown in FIG. 2 the following steps:

a step S21 of operation re-expression which transforms the set of operations produced by the Implementation Core Generation process P1, expressed in terms of a small, uniform instruction set, into operations expressed in terms of a much larger, non-uniform instruction set;

a step S22 of operation implementation which produces implementations of the re-expressed operations obtained from step S21.

a step S23 of sequence conflation, which transforms the operation implementations to leverage sequence-sensitive conflation to resist static analysis; and a step S24 of code generation applied to all of the components of the implementation produced by the sequence conflation step S23, and which are ready to be output in an executable form.

Although the output of step S21 of operation re-expression is referred as having an instruction set, it does not strictly qualify as an instruction set because the sub-operations contained within each instruction have no meaningful, conceptual relationship to each other that would allow them to be given a collective name in order to be used like an instruction in the traditional sense. For example, a "function call" instruction will typically consist of a sequence of sub-operations that have individual meanings (e.g. pushing a value onto the stack, jumping to another program location, etc.) but also have a combined meaning which allows them to be expressed together as a single instruction with the name "function call". Now consider this function call sequence combined with an instruction which adds 1234 to register r0, to make a new instruction. This new instruction would have to be called "call function & add 1234, r0" (or something similar) in order to represent what it does. If say, ten or more instructions are combined in this manner, the resulting name of the new instruction would be too complex and too specific for it to be conceptually meaningful.

In order to achieve the desired transformation, step S21 is performed in two steps; namely, a first step of operation rewriting and a second step of operation combining. The first step of operation rewriting transforms sequences of operations into semantically-equivalent alternative forms using well-known obfuscating transforms, such as opaque expressions, arithmetic/logic rewriting and brute-force equivalent code generation. Sequences of operations are selected randomly and transformed with a randomly-chosen obfuscating transform. This process repeats until a sufficient level of transformation has occurred. Each individual operation may be transformed multiple times during this process. The primary purpose of this step is to reduce the uniformity of the code for the second step. The use of obfuscating transforms does also help to make the resulting code harder to understand, but this is not a critical element of the overall process.

The second step of operation combining combines sequences of operations to produce a new instruction set where each instruction represents the sequence of operations that were combined to produce it. The combining process works (on a per-function basis) by starting at the first operation and choosing a random number of subsequent operations to combine with it. These are combined and associated with a new instruction index. This process then moves onto the next available (non-combined) operation and combines it with a random number of subsequent operations, and so on until all operations have been processed. The purpose of this step is to produce a new instruction set with no conceptual relationship between the operations that make up each instruction. This can be achieved by the combining process alone, but applying it to the non-uniform result of the rewriting step produces far more effective results.

The operation combining step described above is simple and effective, although it could be improved in various ways. For example, as the process reaches the end of a function, the number of operations that are available to be combined will reduced, with a worst case scenario where the last new instruction is formed from a single operation. This is unlikely to pose a significant problem in practice because the heavily-unrolled and inlined nature of the code at this stage will mean that this affects a relatively tiny portion of the code. If this did become problematic, the issue could be eliminated by pre-calculating the combining sequences and randomly redistributing their boundaries until all sequences were of a sufficient minimum size.

The step S22 of operation implementation produces implementations of the re-expressed operations from the previous step S21. An operation implementation includes the following parts:

1. sub-operation implementation parts of the operations that were combined to produce the new instruction;

2. a parameter decoding logic—some operations may be executed in multiple contexts (roughly equivalent to executing a program); these operations will receive context-specific inputs and outputs in the form of parameters that are uniquely encoded for each operation; and 3. an execution continuation logic—after each operation has executed, the next operation and its context (if it has one) are decoded, and execution is then continued by that operation's implementation.

Step S23 of sequence conflation transforms the operation implementations to leverage sequence-sensitive conflation (as explained below) to resist static analysis. Prior to this phase, operation implementations chain directly onto each other and each operation implementation statically decodes its own input/output and continuation parameters. After this phase, each operation implementation chains onto a decoder implementation which in turn chains onto the next operation implementation. A decoder implementation is responsible for decoding the location of the next operation implementation and its parameters, and these are encoded uniquely per decoder implementation using sequence-sensitive conflation values.

The specific decoder implementation that will be chained onto by an operation implementation is context-specific, i.e. the operation implementation receives this as a parameter and has no static knowledge of which decoders it will chain onto. The result of this transformation is that operation implementations are divorced from each other through a context-specific, dynamic set of decoders that are only resolved at the point of use, making static analysis of the operation sequence extremely difficult.

After the sequence conflation step S23 has been completed, all of the components of the implementation are ready to be output in an executable form. In the final step S24 of code generation, all of the operation implementations are rendered together as a piece of stand-alone source code that can be compiled into an existing project and executed directly—this is typically C source code but other implementation languages can be used.

The process P2 involves generating an execution machine that can execute the whitebox implementation. This machine generation uses the obfuscation techniques of steps S21, S22, S23 in addition to the techniques used by the other whitebox generation steps performed in process P1.

The generation of the execution machine assumes that all of these additional obfuscations will be employed everywhere in the execution machine. This may still be true in certain cases but experience has shown that these obfuscations are less effective (in terms of protecting cryptographic algorithms) than the obfuscations used by the other whitebox generation steps of process P1 and are amongst the most expensive obfuscations in terms of performance impact and code size.

According to an embodiment, in order to maximize the use of the most effective obfuscations and to provide more control over overall performance/size impact, execution machines are generated with variable obfuscation complexity, where the complexity can be varied at the per-operation level for maximum control. At the lowest level of complexity, the generated code for an operation is essentially a simple C implementation of the operation with few (if any) redirection mechanisms between the operation and the data it is operating on. Code generated at this level of complexity is typically 10-100 times faster than code generated at maximum complexity, and also significantly smaller. For any given operation, the complexity level can be set to one of a large range of levels between minimum and maximum complexity. As the level is increased, the various obfuscations available for machine generation are progressively enabled, with the maximum level employing all available obfuscations.

Although each operation can have an individual complexity level, in practice complexity levels may be specified at a larger granularity, primarily at the per-function level in the input code and, in certain cases, at the per-block level within functions. Complexity levels are specified in the input code via code annotations. The complexity levels applied to the input code can also be scaled up or down on a global basis, allowing easy generation of execution machines with a range of different complexities. According to an embodiment, a simple linear scaling operation is achieved, but non-linear models are also possible.

The notion of sequence-sensitive conflation is used in a number of steps (S34, S43, S23), according to embodiments, and plays an important role to provide effectiveness. At a high level, sequence-sensitive conflation is a method which allows elements of a program to be dependent on runtime-generated data which appears to be random in nature, such that the program elements will only execute correctly if this data has precisely the correct value at the time the program element executes. This technique is used to obfuscate the logic and data of these program elements in a way which is extremely difficult to resolve statically, since some part of the logic and data cannot be known until the program element is actually being executed. In order for this to work, the data generation sequence is known in advance so that the program elements that use the data can be modified with compensating operations that transform the generated data into specific, known values without revealing those values at the point of use.

In order to be effective at preventing static analysis, the data generation process can be complex enough that the data sequence cannot be predicted in advance by an attacker. This is achieved by injecting a large number of data mutation operations throughout the program where each mutation operation performs a unique sequence of operations on the data generation buffer. These operations can be designed to maximize the mixing of bits within the data buffer.

The obfuscation of the flow of data between operations involves combining the outputs of real and decoy operations. The data elements themselves may be further obfuscated to prevent extraction of useful intermediate data. Intermediate data obfuscation may be applied to virtually any data element produced inside a whitebox, and in practice, it is ideally applied to every single data element. According to an embodiment, the intermediate data elements of the implementation are obfuscated, by associating each of it with an obfuscation context that is unique to that data element and specifies how the data element is obfuscated. For example, if a data element is obfuscated by encrypting it, the obfuscation context will contain the encryption key for that element. When a data element is written by an operation, it will be obfuscated using the obfuscation context, and when it is read by another operation, it will be de-obfuscated using the same obfuscation context. This ensures that the data element is stored in memory in its obfuscated form but is converted into its non-obfuscated form when being operated upon. Because each data element uses a unique obfuscation context (e.g. if encrypted, each one will have a unique encryption key), for an attacker to make sense of the intermediate data as a whole, he will have to break the obfuscation for each individual data element, which is generally impractical.

2. Whitebox Implementations with Dynamic Secrets

The method of whitebox implementations with dynamic secrets facilitates the generation of whitebox implementations where the secret data is dynamic, i.e. known only at runtime. Static keys are a fundamental element of whitebox solutions. The process of creating a whitebox essentially involves embedding a static key into a version of the cryptographic algorithm in a form that makes it difficult to derive the key's value. By contrast, a dynamic key is passed to the whitebox instead of already being embedded within it, which goes against the inherently static nature of the whitebox. According to an embodiment, this issue can be resolved by combining two cryptographic algorithms and generating a single whitebox implementation from the combined algorithm. The ability to do this is a consequence of the whitebox generation (FIG. 2) method's ability to operate on arbitrary cryptographic algorithms, which naturally includes the result of combining two or more algorithms.

To use a dynamic key Kd, with a chosen algorithm Ad, the key Kd is first encrypted with a suitable algorithm (e.g. AES) and a corresponding key, Kaes, to produce an encrypted key Kde:

Kde=EncryptAES(Kaes, Kd)

For simplicity, we will assume that the encrypted key Kde is produced in advance and that the key Kd is never present on the device where the whitebox implementation is running. The encrypted version Kde of the dynamic key Kd can be passed around and stored outside of the whitebox without revealing the value of the dynamic key. To use the dynamic key Kd securely, a whitebox implementation is generated that will decrypt the encrypted version Kde to recover the dynamic key Kd. Then the dynamic key Kd can be used with the algorithm Ad to perform the chosen operation. The overall operation looks like this:

output=Ad(DecryptAES(Kaes, Kde), input)

To generate the whitebox implementation, the source code for the algorithms DecryptAES and Ad are simply combined and a top-level function is created that uses the algorithms to implement the above operation. Note that if the algorithm Ad also happens to be the algorithm DecryptAES, then the input code will only contain a single algorithm which the top-level function will call twice. The whitebox generation method will then generate a single whitebox implementation that performs the entire operation as a single unit within the protection boundary of the whitebox. The same mechanisms which prevent key derivation through observation of the data flow through the whitebox will also prevent extraction of the decrypted key Kd from the whitebox.

The method described above is one of several possible approaches for using dynamic keys with a whitebox implementation, although they all share the common element of combining two or more cryptographic algorithms within a single whitebox. A further extension of the general concept of combining multiple algorithms within a single whitebox would be to allow operations to be performed on encrypted data without revealing the contents of the data. This could be achieved by combining a decrypt operation DecryptAES, an operation on the data DataOp and an encrypt operation EncryptAE, as shown in the following example:

output=EncryptAES(Kaes, DataOp(DecryptAES(Kaes, input)))

3. Preventing Out-of-Context Use

There are two main ways in which an attacker might try to use a whitebox implementation in a context not intended by the application creator:

Attack 1: isolate and copy the implementation into another program. This is relatively trivial for a competent attacker to achieve. Certain elements may make it slightly more complicated in practice—for example, the code may have to be placed at a specific memory location in order to execute it—but a competent attacker will overcome such complications fairly quickly.

Attack 2: copy the entire program containing the implementation and call the implementation directly from another program. There are a few different ways of doing this, but the key element is that the implementation is not separated from the program that uses it. In practice, this attack can be slightly more difficult than the previous one, but it is well within the capabilities of a competent attacker, and may even be easier in certain cases.

According to an embodiment, attack 1 can be prevented by applying an integrity-checking anti-tampering solution to the application containing the whitebox implementation, such that the whitebox code contains anti-tamper checks that verify that the rest of the application is actually present in an expected memory location. If an attacker then attempts to copy just the whitebox code into another program, the anti-tamper checks contained within the whitebox code will fail and the code will refuse to execute. For this to be most effective, the anti-tampering solution should leverage the large body of code provided by the whitebox implementation and automatically inject a large number of integrity checks into that code to make it as difficult as possible for an attacker to defeat them and use the code out-of-context.

Attack 2 is significantly harder to prevent and the method of doing so uses an additional mechanism that is partially external to the whitebox implementation. The additional mechanism is an extension to an integrity-checking anti-tampering solution called "context enforcement". It is worth noting that the underlying approach used by this mechanism has applications beyond its use with the present disclosure.

The core idea behind context enforcement is to introduce conflation between the internals of the whitebox implementation and the program that uses it, such that only the intended uses of the whitebox by the program will produce correct results. At a high level, the process involves injecting conflation producers into the program and conflation targets into the whitebox implementation. The conflation producers generate conflation data as the program executes and the conflation targets combine this data with the operations performed inside the whitebox implementation.

The combination of the conflation data and the whitebox operations are constructed such that the conflation data produced by the normal execution of the program causes no change to the results of the whitebox operations, whereas abnormal program execution (including no execution at all) causes the operations to produce incorrect results. The basic process consists of the following steps:

1. select a set of locations in the application to use as conflation producers;
2. for each conflation producer, inject code that produces conflation data;
3. select a set of operations within the whitebox implementation to use as conflation targets; and
4. transform each conflation target to combine a piece of conflation data with its existing operation.

The selected locations lie along one or more sparse execution paths to the whitebox implementation and these sparse execution paths represent a superset of all possible paths to the implementation. For example, in a simple program with 10 distinct paths to the implementation, there may be 3 locations that appear in all 10 paths. Those 3 locations represent a sparse execution path to the implementation and can therefore be used as locations for context enforcement. Another example would be a simple program with 10 paths to the implementation where half of those paths all go through the same 3 locations but the other half all go through a different 3 locations. This program would have two sparse execution paths for the two sets of 3 locations. Sparse execution paths may intersect and even "contain" each other, there are no restrictions on their relative topologies. The only requirement is that all possible paths to the implementation are represented by at least one sparse execution path.

Each producer typically produces multiple pieces of conflation data and stores each piece in its associated storage location. A storage location may belong to the current producer or any of the producers that execute before it. If the location belongs to the current producer, then it will initialize that location and simply write the data to it. If the location belongs to a previous producer, then the current conflation data is merged with the data already at that location. Conflation data is produced in a number of ways. The simplest method involves executing a unique, generated sequence of operations that transform (statically produced) random input values and using the results of those operations as conflation data. Conflation data can also be produced by combining other pieces of conflation data (e.g. data produced by previous producers) and using selected values produced by the application itself. When a program contains more than one sparse execution path (almost all non-trivial programs will be like this), the conflation producers are also constructed such that all sparse paths produce the same set of conflation data. Without this, the whitebox implementation would only operate correctly from one sparse path (at best).

The selection step generally prefers operations which have a significant impact on the overall cryptographic operation. However, since this may produce selection clusters for many cryptographic algorithms, it also prefers to distribute the selected locations throughout the implementation as much as it can. Another important selection criterion is the suitability of an operation to support the conflation transformation. Although not all operations will be valid targets, many of them are in practice and they are well-distributed throughout the implementation, so this criterion has little impact on the other criteria. Each transformation is constructed such that only the expected value of the conflation data will cause the operation to produce the same result it produced prior to the transformation. All other values will produce incorrect results.

In order to stop an attacker simply dumping the conflation data immediately before it is used and then re-creating this data prior to using the whitebox for his own purposes, the conflation data is stored in a way which makes dumping significantly harder. Each piece of conflation data has a distinct location that is owned by one specific conflation producer (per sparse execution path) and accessible by other producers that need to update it. There are a few different types of location:

static locations which are typically located within a writeable section of the program in memory, much like global variables;

heap locations which are dynamically created through heap allocation; and stack locations which are dynamically created via stack-shifting.

Stack locations can only be used by conflation producers that are on the call path to the whitebox implementation (as opposed to the execution path). Locations are always accessed through stored pointer values which are uniquely encoded for each location. Each producer knows how to decode the pointer values that it uses. Storing the conflation data in this way makes it much harder for an attacker to locate and dump all of the location data successfully and also makes it more difficult to correctly re-create the data at a later point.

4. Preventing Attacks by Isolating a Small Portion of the Algorithm

One of the most effective methods of attacking a whitebox implementation of an algorithm is to isolate a small portion of the algorithm within the whitebox that is known to operate on the secret data (e.g. encryption keys) in some way, and then use brute force attacks on that portion of the algorithm to extract the secret. This is effective because cryptographic algorithms are only designed to be impractical to brute force in their entirety; in most cases, individual parts of these algorithms are quite practical to attack via brute force.

An extremely effective method for isolating algorithm portions is to analyze the memory access patterns of the algorithm implementation. Most cryptographic algorithms have well-known execution patterns that are usually reflected quite accurately in their corresponding memory access patterns, and so even a simple visualization of the memory access patterns can often be used to isolate portions of the algorithm at a sufficient granularity to facilitate a brute force attack.

For example, the AES block cipher algorithm executes 10, 12 or 14 rounds of the same sequence of operations. This manifests as a corresponding sequence of 10/12/14 blocks of related memory accesses that are easy to locate when visualized. An attacker can use this to isolate the last two rounds and then use known methods to derive the AES key by observing the inputs and outputs of these rounds.

According to an embodiment, this type of attack is made more difficult by eliminating access patterns that an attacker may rely on to isolate individual parts of a cryptographic operation. Memory access pattern elimination may be achieved by injecting additional, randomized memory access operations throughout the whitebox implementation of the algorithm. These operations access the same set of memory locations that are accessed by the real operations, but do so with a randomized order and distribution that adds sufficient noise to mask any patterns exhibited by the real operations.

According to an embodiment, memory access pattern obfuscation is implemented as an extension to the decoy generation described above. This extension consists of generating a larger number of decoys, where the additional decoys are created as copies of memory access operations. These additional decoys can also be combined with real operations through opaque expressions, but in practice, a large proportion of them may not be in order to reduce their impact on performance.

According to an embodiment, memory layout obfuscation is performed alongside memory access pattern obfuscation to provide additional protection against the attacks by isolating a small portion of the algorithm. Unlike memory access pattern obfuscation, which seeks to obfuscate access patterns by introducing noise, memory layout obfuscation achieves its goal by randomizing the locations of data fragments in memory.

Without layout obfuscation, related pieces of data typically reside alongside each other, as do the operations which access them, which results in discernable access patterns when visualized. Although memory access pattern obfuscation makes these patterns difficult to observe through the introduced noise, they are still there. By randomizing the locations of data fragments accessed in memory by the real operations, related pieces of data are separated from each other, breaking up any patterns exhibited by the real operations.

The present disclosure has been set forth relative to a number of illustrative embodiments. Since certain changes may be made in the above constructions without departing from the scope of the following claims, it is intended that all matter contained in the above description or shown in the accompanying drawings can be interpreted as illustrative and not in a limiting sense.

The embodiments described herein do not particularly apply to cryptographic algorithms or algorithms manipulating secret data, but can be applied to any algorithm.

It is also to be understood that the following claims are to cover all generic and specific features of the implementations described herein.

The invention claimed is:

1. A computer-implemented method of generating a protected implementation of an algorithm expressed in the form of code stored in a memory, the method comprising:
expanding an original source code implementing the algorithm into a single set of real operations including real operations;
combining each real operation using real data with the real data it uses, to obtain a combination represented in a way which uses an actual real data fragment in a form different from an original form;
producing a set of duplicated and mutated decoy operations representing an alternative implementation of the algorithm, applied to decoy data;
combining the set of duplicated and mutated decoy operations with the set of real operations including the combinations, to obtain an implementation where the duplicated and mutated decoy operations interact with the real operations and real data used by the real operations, such that a real data flow in the implementation is difficult to analyze; and
transforming the implementation into a resulting code stored in the memory and that can be executed, wherein combining the set of duplicated and mutated decoy operations with the set of real operations includes:
interleaving operations from each set with operations from the other set of operations, to obtain a combined set such that when the combined set is executed, all sets of operations are effectively executed at the same time; and
conflating data flows of operations from different sets within the combined set with each other by progressively selecting groups of operations and routing their output data to a correct receiving operation.

2. The method according to claim 1, wherein the algorithm is a cryptographic algorithm and the real data includes secret data.

3. The method according to claim 1, wherein expanding the original source code includes:
executing, by a simulator, the original source code and recording operations being executed, control flow changes that occur and changes to memory that occur;
determining code that is not executed during execution by executing the original source code multiple times by the simulator with different runtime inputs and combining results of these executions into the set of real operations; and
injecting missing code that is not executed during the executions by the simulator, into the set of real operations.

4. The method according to claim 1, wherein expanding the original source code includes producing a data dependency graph modeling data dependencies between operations of the set of real operations and data values flowing between the real operations.

5. The method according to claim 1, wherein expanding the original source code includes eliminating operations of the set of real operations that produce statically-known values, including operations on the real data, such that each of a part of the real data is only present in a most derived form and is propagated as deeply as possible into a resulting set of real operations.

6. The method according to claim 1, wherein expanding the original source code includes reducing a size of the set of real operations by eliminating a proportion of inlined function code and unrolled loops of the set of real operations generated through execution by a simulator, by replacing them with function calls and loops from the original source code, using a decision model that assigns a score to functions and basic blocks that represents a benefit level gained by eliminating inlining and/or unrolling versus a cost in loss of real data propagation that would occur by such an elimination.

7. The method according to claim 1, wherein expanding the original source code includes:
splitting original operations of the source code involving derived real data into multiple new operations such that each new operation uses a piece of the derived real data;
transforming the pieces of the derived real data into unique subsets of operations that produce the pieces of the derived real data, where these subsets of operations consume sequence-sensitive data values generated at runtime;
combining each operation involving a piece of derived real data with the subset of operations that produce the piece of derived real data, to obtained a combined subset of operations; and
inserting the combined subsets of operations into the set of real operations.

8. The method according to claim 1, wherein producing a set of duplicated and mutated decoy operations includes repeating expanding the original source code a number of times to produce original sets of duplicated and mutated decoy operations, where each original set of duplicated and mutated decoy operations is supplied with randomly-generated data instead of the real data, to produce sets of duplicated and mutated decoy operations representing alternative, fake implementations of the algorithm.

9. The method according to claim 1, wherein a routing operation which forwards data output by one of the selected groups of operations to a correct receiving operation is constructed using a uniquely-generated opaque expression that consumes sequence-sensitive data values generated at runtime.

10. The method according to claim 1, wherein the operations of the implementation are expressed in terms of a small, uniform instruction set, transforming the implementation including:
transforming operations sequences of the implementation into semantically-equivalent alternative forms using well-known obfuscating transforms;
combining the operations of the transformed operations sequences to define a new much larger, non-uniform instruction set including new instructions each being defined as an individual function corresponding to the sequence of operations combined to produce the new instruction; and
transforming the implementation using the new instruction set, to obtain a transformed implementation including operations each corresponding to an instruction of the new instruction set.

11. The method according to claim 1, wherein transforming the implementation includes generating execution control code which causes the operations to be executed in a correct sequence and with correct data to execute the algorithm, where execution is controlled by a set of decoder functions, each of the decoder functions being associated with one operation for which it knows a location of data required to execute the operation, and a location of a corresponding instruction function, and how to decode this data which is uniquely encoded for each decoder function.

12. The method according to claim 11, wherein the decoder functions consume sequence-sensitive data values generated at runtime.

13. The method according to claim 1, wherein transforming the implementation includes enabling obfuscation as a function of a complexity level, all obfuscations available at transformation step being enabled when the complexity level is set to a maximum value.

14. The method according to claim 1, further comprising generating a new whitebox implementation for the algorithm where a secret data is known only at runtime, the generating includes combining the implementation with a decryption algorithm using a static key, into the new whitebox implementation using a dynamic secret data which is pre-encrypted using the static key, the decryption algorithm decrypting the dynamic secret data which is transmitted to the implementation.

15. The method according to claim 1, further comprising generating a new whitebox implementation performing data-processing operations on an encrypted data without revealing content of the encrypted data, the generating including combining a decryption algorithm, the implementation and an encryption algorithm into the new whitebox implementation, where the decryption and encryption algorithms are inverse of each other and use a same static key, whereby the decryption algorithm decrypts the data to be processed, the implementation operates on the decrypted data and the encryption algorithm re-encrypts the data.

16. The method according to claim 1, further comprising preventing the implementation from being used in contexts other than those intended by a program containing the implementation, the preventing including:
   injecting conflation producers into the program where the conflation producers generate conflation data as the implementation executes, by mixing either randomly-generated data or real data with existing conflation data; and
   injecting conflation targets into the implementation, where the conflation targets read conflation data and combine these data with static data used by operations inside the implementation, and where the static data used by the operations are modified such that they are incorrect and correct data are produced only when they are combined with the conflation data, making the operations dependent on the conflation data being correctly generated by the execution of the program, where each piece of conflation data has a distinct location known only to the conflation producers that need to modify it and to the conflation targets within the implementation.

17. The method according to claim 1, further comprising obfuscating each intermediate data element, and associating each intermediate data element with an obfuscation context that is unique to that data element and specifies how the data element is obfuscated.

18. The method according to claim 1, further comprising injecting additional, randomized memory access operations throughout the implementation to mask memory access patterns exhibited by the real operations.

19. The method according to claim 1, further comprising randomizing locations of data fragments of the real data accessed in memory by the real operations.

20. A non-transitory computer-readable medium storing an application adapted to be run on a device, the application including instructions that, when executed by the device, result in:
   expanding an original source code implementing an algorithm into a single set of real operations including real operations;
   combining each real operation using real data with the real data it uses, to obtain a combination represented in a Way which uses an actual real data fragment in a form different from an original form;
   producing a set of duplicated and mutated decoy operations representing an alternative implementation of the algorithm, applied to decoy data;
   combining the set of duplicated and mutated decoy operations with the set of real operations including the combinations, to obtain an implementation where the duplicated and mutated decoy operations interact with the real operations and real data used by the real operations, such that a real data flow in the implementation is difficult to analyze; and
   transforming the implementation into a resulting code stored in a memory and that can be executed, wherein combining the set of duplicated and mutated decoy operations with the set of real operations includes:
      interleaving operations from each set with operations from the other set of operations, to obtain a combined set such that when the combined set is executed, all sets of operations are effectively executed at the same time; and
      conflating data flows of operations from different sets within the combined set with each other by progressively selecting groups of operations and routing their output data to a correct receiving operation.

21. A device for protecting an algorithm expressed in the form of code by generating a protected implementation of the algorithm, the device comprising:
   a processor;
   a memory operationally coupled with the processor, the memory having instructions stored thereon that, when executed by the processor, result in:
   expanding an original source code implementing the algorithm into a single set of real operations including real operations;
   combining each real operation using real data with the real data it uses, to obtain a combination represented in a Way which uses an actual real data fragment in a form different from an original form;
   producing a set of duplicated and mutated decoy operations representing an alternative implementation of the algorithm, applied to decoy data;
   combining the set of duplicated and mutated decoy operations with the set of real operations including the combinations, to obtain an implementation where the duplicated and mutated decoy operations interact with the real operations and real data used by the real operations, such that a real data flow in the implementation is difficult to analyze; and
   transforming the implementation into a resulting code stored in the memory and that can be executed, wherein combining the set of duplicated and mutated decoy operations with the set of real operations includes:
      interleaving operations from each set with operations from the other set of operations, to obtain a combined set such that when the combined set is executed, all sets of operations are effectively executed at the same time; and
      conflating data flows of operations from different sets within the combined set with each other by progressively selecting groups of operations and routing their output data to a correct receiving operation.

22. The device according to claim 21, wherein the algorithm is a cryptographic algorithm and the real data includes secret data.

23. The device according to claim 21, wherein expanding the original source code includes:
- executing, by a simulator, the original source code and recording operations being executed, control flow changes that occur and changes to memory that occur;
- determining code that is not executed during execution by executing the original source code multiple times by the simulator with different runtime inputs and combining results of these executions into the set of real operations; and
- injecting missing code that is not executed during the executions by the simulator, into the set of real operations.

24. The device according to claim 21, wherein expanding the original source code includes producing a data dependency graph modeling data dependencies between operations of the set of real operations and data values flowing between the real operations.

25. The device according to claim 21, wherein expanding the original source code includes eliminating operations of the set of real operations that produce statically-known values, including operations on the real data, such that each of a part of the real data is only present in a most derived form and is propagated as deeply as possible into a resulting set of real operations.

26. The device according to claim 21, wherein expanding the original source code includes reducing a size of the set of real operations by eliminating a proportion of inlined function code and unrolled loops of the set of real operations generated through execution by a simulator, by replacing them with function calls and loops from the original source code, using a decision model that assigns a score to functions and basic blocks that represents a benefit level gained by eliminating inlining and/or unrolling versus a cost in loss of real data propagation that would occur by such an elimination.

27. The device according to claim 21, wherein expanding the original source code includes:
- splitting original operations of the source code involving derived real data into multiple new operations such that each new operation uses a piece of the derived real data;
- transforming the pieces of the derived real data into unique subsets of operations that produce the pieces of the derived real data, where these subsets of operations consume sequence-sensitive data values generated at runtime;
- combining each operation involving a piece of derived real data with the subset of operations that produce the piece of derived real data, to obtained a combined subset of operations; and
- inserting the combined subsets of operations into the set of real operations.

28. The device according to claim 21; wherein producing a set of duplicated and mutated decoy operations includes repeating expanding the original source code a number of times to produce original sets of duplicated and mutated decoy operations, where each original set of duplicated and mutated decoy operations is supplied with randomly-generated data instead of the real data; to produce sets of duplicated and mutated decoy operations representing alternative; fake implementations of the algorithm.

29. The device according to claim 21; wherein a routing operation is constructed using a uniquely-generated opaque expression that consumes sequence-sensitive data values generated at runtime.

30. The device according to claim 21, wherein the operations of the implementation are expressed in terms of a small, uniform instruction set, transforming the implementation including:
- transforming operations sequences of the implementation into semantically-equivalent alternative forms using well-known obfuscating transforms;
- combining the operations of the transformed operations sequences to define a new much larger; non-uniform instruction set including new instructions each being defined as an individual function corresponding to the sequence of operations combined to produce the new instruction; and
- transforming the implementation using the new instruction set; to obtain a transformed implementation including operations each corresponding to an instruction of the new instruction set.

31. The device according to claim 21, wherein transforming the implementation includes generating execution control code which causes the operations to be executed in a correct sequence and with correct data to execute the algorithm; where execution is controlled by a set of decoder functions, each of the decoder functions being associated with one operation for which it knows a location of data required to execute the operation, and a location of a corresponding instruction function, and how to decode this data which is uniquely encoded for each decoder function.

32. The device according to claim 31, wherein the decoder functions consume sequence-sensitive data values generated at runtime.

33. The device according to claim 21, wherein transforming the implementation includes enabling obfuscation as a function of a complexity level, all obfuscations available at transformation step being enabled when the complexity level is set to a maximum value.

34. The device according to claim 21, wherein the instructions, when executed by the processor, further result in generating a new whitebox implementation for the algorithm where a secret data is known only at runtime, the generating includes combining the implementation with a decryption algorithm using a static key, into the new whitebox implementation using a dynamic secret data which is pre-encrypted using the static key, the decryption algorithm decrypting the dynamic secret data which is transmitted to the implementation.

35. The device according to claim 21, wherein the instructions, when executed by the processor, further result in generating a new whitebox implementation performing data-processing operations on an encrypted data without revealing content of the encrypted data, the generating including combining a decryption algorithm, the implementation and an encryption algorithm into the new whitebox implementation, where the decryption and encryption algorithms are inverse of each other and use a same static key, whereby the decryption algorithm decrypts the data to be processed, the implementation operates on the decrypted data and the encryption algorithm re-encrypts the data.

36. The device according to claim 21, wherein the instructions, when executed by the processor, further result in preventing the implementation from being used in contexts other than those intended by a program containing the implementation, the preventing including:

injecting conflation producers into the program where the conflation producers generate conflation data as the implementation executes, by mixing either randomly-generated data or real data with existing conflation data; and injecting conflation targets into the implementation, where the conflation targets read conflation data and combine these data with static data used by operations inside the implementation, and where the static data used by the operations are modified such that they are incorrect and correct data are produced only when they are combined with the conflation data, making the operations dependent on the conflation data being correctly generated by the execution of the program, where each piece of conflation data has a distinct location known only to the conflation producers that need to modify it and to the conflation targets within the implementation.

37. The device according to claim 21, wherein the instructions, when executed by the processor, further result in obfuscating each intermediate data element, and associating each intermediate data element with an obfuscation context that is unique to that data element and specifies how the data element is obfuscated.

38. The device according to claim 21, wherein the instructions, when executed by the processor, further result in injecting additional, randomized memory access operations throughout the implementation to mask memory access patterns exhibited by the real operations.

39. The device according to claim 21, wherein the instructions, when executed by the processor, further result in randomizing locations of data fragments of the real data accessed in memory by the real operations.

* * * * *